(12) United States Patent
Rödhammer

(10) Patent No.: US 6,907,661 B2
(45) Date of Patent: Jun. 21, 2005

(54) METHOD OF JOINING A HIGH-TEMPERATURE MATERIAL COMPOSITE COMPONENT

(75) Inventor: Peter Rödhammer, Ehenbichl (AT)

(73) Assignee: Plansee Aktiengesellschaft, Reutte (AT)

(*) Notice: Subject to any disclaimer, the term of this patent is extended or adjusted under 35 U.S.C. 154(b) by 197 days.

(21) Appl. No.: 10/135,472

(22) Filed: Apr. 30, 2002

(65) Prior Publication Data

US 2002/0158112 A1 Oct. 31, 2002

(30) Foreign Application Priority Data

Apr. 30, 2001 (AT) .................................. GM 337/2001 U

(51) Int. Cl.$^7$ .......................... B21D 51/16; B23P 11/00; B01D 50/00
(52) U.S. Cl. .......................... 29/890; 29/428; 422/180; 422/222; 228/121; 228/122.1
(58) Field of Search ................................ 228/218, 193, 228/194, 198, 265, 174, 121, 122.1

(56) References Cited

U.S. PATENT DOCUMENTS

| | | | | |
|---|---|---|---|---|
| 3,930,041 A | * | 12/1975 | Komatsu et al. | 426/396 |
| 4,343,836 A | * | 8/1982 | Newkirk et al. | 427/249.3 |
| 4,482,837 A | * | 11/1984 | Koizumi et al. | 378/144 |
| 4,919,594 A | * | 4/1990 | Wright et al. | 416/230 |
| 5,023,043 A | | 6/1991 | Kotzlowski et al. | |
| 5,320,729 A | * | 6/1994 | Narizuka et al. | 204/298.13 |
| 5,866,079 A | * | 2/1999 | Machida et al. | 422/179 |
| 6,540,130 B1 | * | 4/2003 | Rodhammer | 228/265 |
| 6,568,078 B2 | * | 5/2003 | Eisenstock | 29/890 |
| 2003/0026060 A1 | * | 2/2003 | Hiramatsu et al. | 361/311 |
| 2003/0057584 A1 | * | 3/2003 | Yoshida et al. | 264/85 |

FOREIGN PATENT DOCUMENTS

| | | |
|---|---|---|
| EP | 0 181 385 B1 | 5/1986 |
| FR | 2 785 664 | 5/2000 |

* cited by examiner

*Primary Examiner*—L. Edmondson
(74) *Attorney, Agent, or Firm*—Laurence A. Greenberg; Werner H. Stemer; Ralph E. Locher

(57) ABSTRACT

Nonmetallic high-temperature material, such as graphite, CFC or SiC, or components produced from these materials, are joined using the two-stage process. First the structural components are canned and the canning foil is tightly pressed onto the surface contour of the structural components. Then the components are joined to a composite component by forming a material-to-material bond between the metal canning foils. This widens the hitherto highly restricted field of technical application for materials of this type.

16 Claims, 1 Drawing Sheet

METHOD OF JOINING A HIGH-TEMPERATURE MATERIAL COMPOSITE COMPONENT

BACKGROUND OF THE INVENTION

FIELD OF THE INVENTION

The invention relates to a process for producing a structural composite from high-temperature materials by joining a plurality of structural components, including at least one nonmetallic structural component, incorporating a metal interlayer in the joining surface(s).

Nonmetallic high-temperature materials are those which are based on carbon or silicon carbide, in particular including carbon fiber-reinforced materials, such as for example carbon fiber-reinforced carbon (CFC), but also other ceramic materials. At high temperatures, these materials have higher strengths than the high-melting metals and in particular have a considerably lower density than those materials. Accordingly, the range of technical applications for nonmetallic high-temperature materials is firstly in components which are exposed to movements with considerable acceleration, for example in vehicles, in particular including air and space travel, and secondly in the area of high thermal radiation, for example as protective walls with a heat exchange function, such as the first wall of fusion reactors. Further applications are in the field of rotary anodes for X-ray installations or in charge carriers in high-temperature furnaces.

Components which are produced in accordance with the prior art processes from nonmetallic high-temperature materials, and manufacturing processes relating to such components, provide for these considerable advantages, but also come with a range of drawbacks and problems. One significant problem is based on the poor availability of these materials. Standard joining methods, such as welding, screw-connection, riveting in many cases cannot be employed or can at best be employed with a high risk of failure. Soldering or brazing materials of this type is difficult or even impossible, firstly because of wetting problems, but in particular also because of the generally high porosity of materials of this type, since porous materials suck up the solder in a manner which cannot adequately be controlled. The residual porosity of materials of this type is likewise an obstacle to them being used, for example, as a gastight surround for vacuum vessels, and also for use in pipe systems for gases and liquids. The fact that materials of this type often have only a moderate resistance to corrosion or oxidation also very considerably limits their applications. In many cases, the materials have an insufficient resistance to reacting with liquid metals. Also, carbon fiber-reinforced CFC and C-SiC composite materials rapidly and progressively lose strength when used in air even at temperatures of below 1000° C. as a result of oxidation of the fibers.

Although at high temperatures nonmetallic high-temperature materials generally have a higher tensile and compressive strength than the high-temperature-resistant refractory metals, they are relatively brittle. They therefore fail when relatively high flexural and alternating loads are applied.

The art combats these drawbacks, which are encountered to different extents for individual nonmetallic high-temperature materials, by designing composite materials or composite components comprising different types of materials, if appropriate in combination with metallic materials or metallic high-temperature materials, in order to compensate for or reduce drawbacks of this group of nonmetallic materials and, at the same time, to make use of the advantageous properties thereof. The formation of composite components requires active joining of individual component parts. The risks and drawbacks involved in joining nonmetallic high-temperature materials to form a composite which has already been described greatly restrict the wide range of applications which would otherwise be conceivable.

A composite component is described, for example, in U.S. Pat. No. 5,023,043 (European patent EP 0 181 385 B1). The actively cooled device made from a material which can withstand high thermal loads, such as graphite, carbide or ceramic or a metal-ceramic composite material, has recesses which are round in cross section and into which metallic coolant lines are brazed with surface-to-surface contact. Here, metallic pipelines, which are preferably circular in cross section are brazed into semicircular recesses in the surface of a component and, at the same time, a plurality of such components are joined to form a brazed composite. The cooling pipes generally consist of high-melting metals with coefficients of thermal expansion which are similar to those of the materials which can withstand high thermal loads. A drawback of this composite component comprising high-temperature materials is that the pipes cannot be brazed into the material which can withstand high thermal loads with sufficient durability over the entire surface of the pipe, and therefore the required heat transfer via the pipe wall to the coolant is not achieved in the long term.

Published French patent application FR 2 785 664 A1 describes a heat exchanger made from a joined high-temperature composite material, and a process for its production. The wall-type component is constructed in layers from a plurality of different materials. Coolant passages, in the form of surface recesses, are formed in an interlayer, which was initially produced separately, made from a high-temperature composite material, such as carbon fiber-reinforced graphite. The interlayer is surrounded by two outer layers, one consisting of a ceramic-based composite material, e.g. C/SiC, and the other consisting of a different high-temperature composite material, e.g. carbon-reinforced carbon.

The recesses in the surface of the interlayer are optionally provided with a metallic layer which is deposited on the interlayer before the joining operation to form a composite. The coating is used to make the passage surface impermeable for the coolant that flows through it. Without this layer, the coolant would penetrate into the structure of the composite material, which is usually porous. The three layers of the composite component are brazed together, preferably as a result of a solder foil being introduced between the joining surfaces.

The major drawback of a heat exchanger composite component of that type is that the brazing of the individual layers or laminates of the composite part via the respective joining surfaces is not controlled with sufficient reliability. The brazing is insufficiently homogeneous and therefore lacks long-term durability. The brazing process leads to thermal distortion of the material and to undesirable melting reactions, which adversely alter the material properties, in the edge zones of the composite materials which adjoin the solder layer.

SUMMARY OF THE INVENTION

It is accordingly an object of the invention to provide a method of joining a high-temperature joined composite component made from a nonmetallic high-temperature material, which overcomes the above-mentioned disadvantages of the heretofore-known devices and methods of this general type and which ensures a permanently reliable joining zone, as far as possible produced by material-to-material bonding, between individual structural components.

With the foregoing and other objects in view there is provided, in accordance with the invention, a method of producing a composite component, which comprises:

providing a plurality (i.e., at least two) of structural components of high-temperature material, that is, providing at least one non-metallic structural component of high-temperature material and at least one further structural component of high-temperature material;

applying a gastight metal foil with a thickness from 10 to 2000 µm to the non-metallic structural component by way of a canning process followed by at least one of die pressing and isostatic pressing, to form at least one canned component; and subsequently joining at least two of the structural components at joining surfaces thereof, with a process selected from the group consisting of brazing, welding, and common canning in a metal foil with a material-to-material bond effected by hot pressing or hot isostatic pressing, to form the composite component.

The resulting composite component is particularly suitable for integration as a part in a propulsion engine of an aircraft or a spacecraft.

With the above and other objects in view there is also provided, in accordance with the invention, a composite component, which comprises:

a plurality of structural components including at least one structural component of non-metallic high-temperature material;

a gastight metal foil with a thickness from 10 to 2000 µm tightly encasing the structural component of non-metallic high-temperature material; and the plurality of structural components being joined at joining surfaces thereof with material-to-material bonding between the metal foil and an adjoining the joining surface.

In a preferred embodiment of the invention, at least one of the plurality of structural components has a surface with one or more recesses formed therein, and the composite component has one or more cavities formed therein defined by the one or more recesses formed in the surface of the at least one structural component.

The composite is also particularly suitable as an X-ray rotary anode. In that case, at least one of the structural components is made from a carbon-based material and at least one further structural component is made from a refractory metal.

In general terms, the improved process is in particular intended to open up a widened range of possible applications for composite components of this type in sectors where the high residual porosity, moderate resistance to corrosion and lack of ability to withstand fluctuating mechanical and thermal loads of nonmetallic high-temperature materials have hitherto made such applications impossible.

According to the invention, the object is achieved by the fact that a gastight metal foil, which is from 10 to 2000 µm thick, is applied, closely following the contours, to the surface of at least one structural component made from a nonmetallic high-temperature material, including the surfaces of recesses in the surface of this component, by means of a standard canning process followed by die pressing or isostatic pressing, and that then the individual structural components, at the joining surface(s), are brazed, welded and/or, as above, canned together in a metal foil, and are joined with material-to-material bonding, by means of hot pressing or by means of hot isostatic pressing, to form the composite component.

Metallic high-temperature materials are the high-melting metals or refractory metals, in particular the metals belonging to subgroups V and VI of the periodic system, but also other metals with a melting point of >1800° C.

The term high-temperature material encompasses the groups of metallic and nonmetallic materials which were listed in the introduction. It is not restricted to these materials.

The term structural components indicates that these are shaped components or parts which have often already been provided with desired dimensions and may optionally have recesses of complex shapes in their surface, for example grooves and half-shell recesses for subsequent use as coolant lines in the joined composite component.

The canning process, like die pressing or isostatic pressing, is a process which is in widespread use primarily in powder metallurgy and is technologically developed. By means of the canning process, materials which are enclosed in a metal foil as the can are closed off in a vacuum-tight manner, so that during the subsequent pressing there can be no mass transfer between the contents of the can and the surrounding pressure-transmitting medium. In powder metallurgy, for materials synthesis from different powder components or for further compression of porous materials, materials are canned and then pressed or hot pressed. The joining of composite components comprising individual, pressed components by hot pressing or hot isostatic pressing is also known in powder metallurgy.

Unlike in the prior art, where the parts or components or structural components which are to be joined are each placed directly against one another, in uncanned form, along the joining surfaces, are canned jointly and then, for the purpose described above, are joined in a single step by isostatic or hot isostatic pressing, in the process according to the invention everything is directed toward positively locking or, better, material-to-material forming of the canning foil and the surface of the structural components, including at the complex surface recesses thereof—starting from the choice of the canning material and its dimensions through the can design, all the way to the process parameters used during the hot isostatic pressing. In the case of the present invention, the compacting effect is at most used as an advantageous side-effect.

Therefore, at the end of a first stage of the process according to the invention, there is a structural component made from a nonmetallic high-temperature material which is completely surrounded by metal or, in the case of subsequent deliberate material-removing machining only in certain regions, is metallically surrounded at least at the intended joining surfaces, and which therefore, with a view to its ability to be processed further by joining, acts in the same way as a metallic structural component made from the canning material as component material.

Therefore, according to the invention, it is possible to join encased structural components, in the same way as the metals, by means of known, tried-and-tested joining processes using brazing, welding, hot pressing or hot isostatic pressing. The joining by hot isostatic pressing of structural components which have been canned in foils of high-melting metals has proven particularly successful.

Therefore, for the process step of joining to form the composite component, there is a structural component having properties of a nonmetallic high-temperature material which, however, no longer has, or has to a greatly reduced extent, the drawbacks of the lack of joinability of nonmetallic high-temperature materials. Furthermore, it is possible to produce composite components whose internal cavities or passages, which are provided with a metallically sealed lining, in a relatively simple manner and with relatively little outlay.

In terms of process engineering, the joining process according to the invention can be carried out in a well-controlled manner. In this way, it is possible to achieve the desired combination of component properties with a high level of reliability and reproducibility.

The process according to the invention, contrary to what is the case when structural components made from nonmetallic high-temperature materials are being joined by brazing in accordance with the prior art, results in a range of highly advantageous effects and materials properties.

For example, in the process according to the invention, on account of the materials symmetry of the composite formed, which is equally present in both process stages, the possibility of an undesired change in shape as a result of material distortion is substantially ruled out.

On the other hand, however, molten high-temperature brazing materials can trigger aggressive chemical reactions with the adjoining materials, a phenomenon which often has to be accepted when brazing in accordance with the prior art. In particular, the molten brazing material can locally dissolve adjoining component zones to such an extent that it is no longer ensured that the structural component is sealed against the penetration of molten material. The joining of structural components by means of brazing to form composite components according to the present invention will therefore remain limited to applications wherein the molten solder has not caused any such drawbacks.

In the case of hot isostatic pressing or hot pressing according to the invention, the temperatures are 0.3 to $0.6 \times T_M$, typically 40% of the melting point $T_M$ of the lowest-melting metallic component that adjoins the joining surface. By contrast, the melting points of the solder during brazing according to the prior art, for strength reasons, are significantly higher than the highest possible temperature at which a structural component can be used. For this reason, the inventive process has considerable advantages over the process according to the prior art with regard to the mechanical load-bearing capacity of the composite, composite stresses and material distortion and with regard to undesirable secondary chemical reactions.

By means of the hot pressing or hot isostatic pressing of canning foil according to the present invention, it is possible to apply metallic coverings which accurately match the contours, have material-to-material bonding and a relatively uniform thickness and are highly vacuum-tight. By contrast, in the case of metallic PVD or CVD coating of surfaces, which are subsequently to be joined, with surface recesses, in accordance with the prior art, these recesses, in the joined state, serving as passages for cooling liquids to pass through, it is in practice impossible to form uniformly thick and/or gastight metal layers in the regions of recesses.

For composite components according to the invention, for example actively cooled composite components in the range of applications T<900° C., copper alloys have proven to be a particularly suitable canning material, but nickel, aluminum, precious metals and even iron alloys have also successfully been used.

The high melting or decomposition points of nonmetallic high-temperature materials recommend the high-melting metals, in particular tungsten, molybdenum, tantalum, niobium, titanium and alloys thereof, as canning materials for uses at temperatures of over 1000° C.

The wall thickness of the metallic surround applied as the can is, according to the invention, between 10 and 2000 $\mu$m. It depends on the dimensions of the surface structures which are to be reproduced, on the mechanical and/or corrosive loads acting on the structural component and on the mechanical, thermomechanical and corrosion chemistry properties of the canning material. The thickness of the metal canning sheet is kept as low as necessary, preferably between 10 and 500 $\mu$m.

On the other hand, the wall thickness of the canning foil is to be selected to be so high that, even in the event of local expansions of more than 100%, as may occur under superplastic deformation conditions, the dimensions do not fall below the mininum required—for example for reasons of gastightness or mechanical stability.

The risk of excessive local expansions of the canning material can advantageously be avoided by adapting the structural design, for example by rounding edges.

Thicker metallic internal linings lead to the composite component having a higher mechanical load-bearing capacity in relative terms, for example with respect to the internal pressure of the cooling medium.

The inventive application of a canning material to the surface recesses, which subsequently serve as a cooling passage, of a structural component is therefore a far more flexible and economic process than, for example, the brazing of metallic pipes into the interior of a composite component made from a nonmetallic high-temperature material in accordance with the known prior art.

The metallic surround of the structural components at the joining surfaces and/or over the entire composite component will, on account of its significantly higher ductility, generally significantly increase the strength of the entire composite part, in particular with respect to impact loads, cyclically fluctuating loads or flexural loads. This advantage is particularly significant in designs wherein the composite components consist exclusively of nonmetallic high-temperature materials and do not have any supporting layers of metal.

According to the invention, the canning foil is molded onto the surface of the structural component by pressing or hot pressing. The temperature which is to be established is process-dependent and depends on the plasticity of the canning material. If it is technically appropriate, the temperatures in conjunction with the pressing times are to be selected in such a way that, in addition to the foils being bonded to the base material closely matching the contours, material-to-material bonding with mutual diffusion is also ensured. In this context, a diffusion zone of between 0.1 and 10 $\mu$m is generally sufficient. The can is preferably molded onto the structural component at homologous temperatures of the canning material in the range from T=0.3–0.6×$T_M$ as the melting point of the canning material.

The drawback which is frequently observed in components according to the prior art, namely that regions of joining surfaces without a material-to-material bond, for example on account of surfaces which have not been wetted with solder during the brazing, and the risk of unobserved detachment of even only individual surface regions, especially during cooling of a composite component used as a heat exchanger, can practically be ruled out during joining in accordance with the invention.

Depending on the process conditions (pressure, temperature, duration), the external application of pressure to the structural components during the surrounding operation and to the composite component during the joining in accordance with the invention results in some cases in perceptible compacting of the usually porous nonmetallic high-temperature materials and therefore improves both the mechanical properties and the density with respect to the undesirable penetration of surrounding gaseous media. The associated shrinkage in the external component dimensions is to be taken into account by precautionary measures.

Nonmetallic materials often have surface roughnesses, such as macropores and machining marks of different size and depth. Where feasible, this roughness is covered over by the canning material, and the contours are not closely matched. Accordingly, the foil thickness will be selected to be greater than the dimensions of this surface roughness. The surface of the surrounded component which is obtained in this way is then significantly smoother than that of the starting material which is to be joined, which generally leads to a higher quality of join in the subsequent step of joining to form the composite component.

When the inventive process is being carried out, in addition to the alloy formation, disruptive chemical reactions may also occur between the high-temperature material of the structural component and the canning material. For example, brittle compounds, such as carbides or low-melting silicides, may form. In such cases, the metal foil, prior to the canning operation, is coated on its inner side with a reaction barrier thin film, for example by means of a vapor-phase process. When surrounding graphite-containing and carbon-containing high-temperature materials, an internal coating of rhenium, a metal which is known not to form carbides, has proven particularly successful. Another important reason for in some instances coating metallic foils prior to the canning process is the corrosion protection with respect to cooling media, if the composite components are produced as actively cooled components with cooling lines.

A particular advantage of the inventive process is the possibility of producing composite components with structural recesses of complex shape in the joining surfaces of the individual structural components, e.g. a network of cooling passages. The surface shaping and subsequent joining, in particular of surface recesses produced mirror-symmetrically in two parts, allows complex cross sections and arrangements of these internal structures and avoids high manufacturing costs which would be incurred in alternative processes with corresponding systems of cavities being formed in the solid body.

According to an advantageous configuration of the process according to the invention, an additional material, which is substantially insoluble in the canning material and has a lower melting point than that of the canning material, is introduced, for example, in the form of a metal sheet or of powder, between the metal canning sheet and nonmetallic high-temperature material of a structural component. In particular, in the case of highly porous high-temperature materials based on carbon, such as for example CFC with a residual porosity of generally 10 to 20% by volume, copper is added, as pulverulent material or a sheet-metal foil, to a can made from a niobium alloy, in a quantity which is adapted to the pore volume. During the subsequent hot isostatic pressing, the temperature, at 1100° C. to 1300° C., is adapted in such a way that the pulverulent copper becomes molten and penetrates into the pores in the high-temperature material. By using a process of this type, it is possible to deliberately modify the properties of porous high-temperature materials at the same time as the joining step.

After the die pressing or isostatic pressing of the composite component, the metallic canning material can be mechanically removed from the surface of the component down to the material below it, for example by machining. However, in some cases it is left at certain regions of the composite component or even over the entire component, primarily if the high-temperature material itself has a poor mechanical stability, e.g. a low fracture toughness.

Other features which are considered as characteristic for the invention are set forth in the appended claims.

Although the invention is illustrated and described herein as embodied in a process for joining a high-temperature material composite component, it is nevertheless not intended to be limited to the details shown, since various modifications and structural changes may be made therein without departing from the spirit of the invention and within the scope and range of equivalents of the claims.

The novel process is explained in more detail with reference to the following exemplary embodiments.

The construction and method of operation of the invention, together with additional objects and advantages thereof, will be even better understood from the following description of a specific embodiment when read in connection with the accompanying drawings.

EXAMPLE 1 describes the production of a wall element, which is provided for active cooling, from carbon fiber-reinforced silicon carbide with internal cooling passages. Two structural components with dimensions of 250×140×10 mm underwent vacuum-tight canning with Ta foils of a thickness of 0.25 mm, followed by hot isostatic pressing at temperatures of between 1100° C. and 1400° C. and with argon as pressure medium, at pressures of between 50 and 100×10$^6$ Pa for 1–2 hours. After this step, the foils had been molded on so as to match the contours of the recesses in the base material. Microsections taken from comparative specimens confirmed that there was a material-to-material bond between Ta and the silicon carbide, forming a thin interlayer of tantalum suicides. The peripheral projections of the surrounding Ta material on the two structural components, which had been used to weld the cans, were cut to length and, with the addition of short rods of solid Ta to cover the grooves in the component surfaces, were vacuum-welded. The structural components, which had been mechanically fixed in position with respect to one another in this way and were in each case surrounded, underwent hot pressing using the same process parameters as those described above and were joined to one another with material-to-material bonding. As a result of the rods which had been inserted into the grooves being drilled open, and following final peripheral machining, the finished composite component comprising carbon fiber-reinforced silicon carbide with internal cooling passages was obtained.

DETAILED DESCRIPTION OF A PREFERRED EMBODIMENT

Figure 1A:
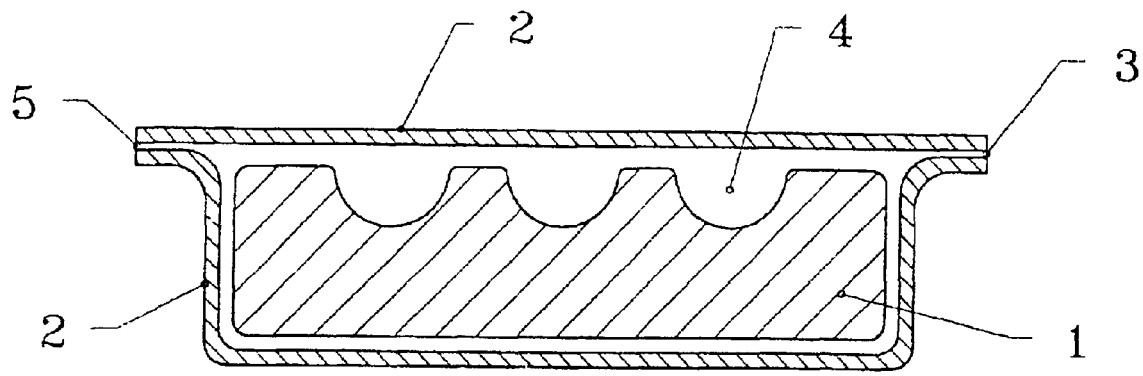
FIG. 1A is a diagrammatic section taken through a nonmetallic structural component.

Referring now to the figures of the drawing in detail and first, particularly, to FIG. 1 thereof, a (non-metallic) structural component 1 is formed with longitudinal grooves 4. The component 1 is disposed in a metallic can formed from a sheet-metal foil 2. After an evacuation process, the can is welded at the edges along a weld seam 5.

Figure 1B:
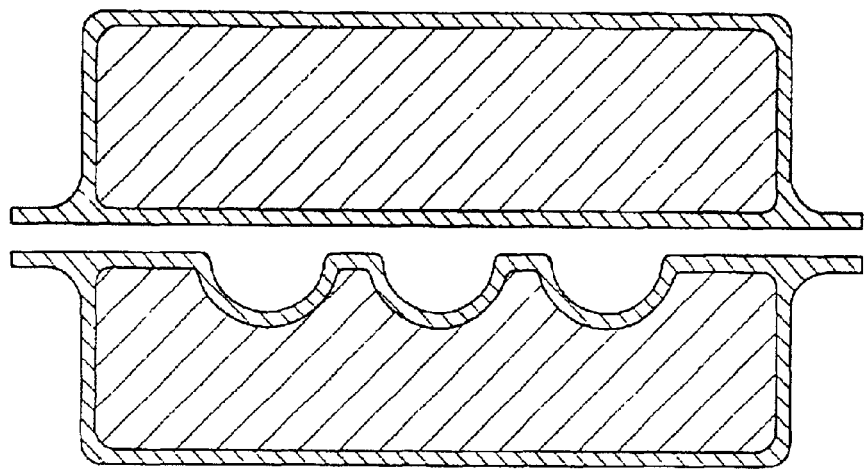
FIG. 1B is a diagrammatic section through two (nonmetallic) canned structural components placed on top of one another.

In FIG. 1B, two (non-metallic) canned structural components are placed next to one another. Here, their metal canning sheet has been molded on with matching contours and material-to-material bonding by the action of external pressure/temperature in accordance with the invention.

Figure 1C:
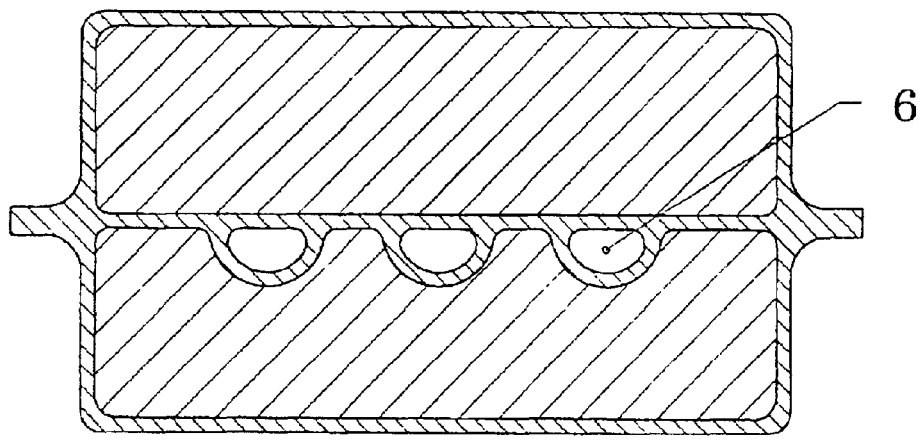
FIG. 1C is a diagrammatic cross section through the composite component which has been joined in accordance with the invention.

FIG. 1C shows the composite component which has been joined in accordance with the invention after the two surrounded structural components have been canned again and after joining by the action of pressure/temperature in accordance with the description. The joining operation results in the formation of closed passages 6 from surface recesses in one or both of the structural component.

Both the individual components and the joined cooling element have a planarity of better than 0.2 mm over the overall length of 250 mm. The passages had a uniform cross section without any narrowed sections and were highly vacuum-tight. The composite was able to withstand the required test pressure in the passages of 80 bar ($8 \times 10^6$ Pa) without damage. The room-temperature bending strength measured on an encased comparative specimen was 35% higher than that of a reference specimen of the same overall cross section made from non-encased base material.

EXAMPLE 2 describes the production of a pipe from carbon fiber-reinforced carbon (CFC) with passages for a coolant to flow through for active cooling.

The pipe was produced from two structural components, namely an inner pipe with an inner diameter of 193 mm and an outer diameter of 203.5 mm and an outer pipe with an inner diameter of 207 mm and an outer diameter of 218 mm. The pipe length was in each case 400 mm. A semi-cylindrical spiral groove with a radius of 3 mm was milled into the outer surface of the inner part, as a subsequent cooling passage. The groove in this case ended in each case approximately 5 mm before the end of the pipe, so that the cylindrical cross section was retained at the end of the pipe. The inner part and outer part were canned by means of 1.0 mm thick niobium sheets. Before the canning, the niobium sheet was coated on one side with a 20 $\mu$m thick rhenium layer by means of ion plating. The coated sheet-metal surface faced the CFC during canning.

Then, each of the two parts underwent hot isostatic pressing at 1350° C. and a pressure of $70 \times 10^6$ Pa for a period of 4 hours. In the process, the niobium sheets were molded to match the contour of the pipe surfaces and were inseparably joined thereto. Then, the outer circumference of the inner pipe and the inner circumference of the outer pipe were remachined, with material being removed, to a fit of approx. 0.25 mm diameter clearance. The projecting can edges were likewise removed by turning. Then, the two pipe parts were pushed over one another, and the pipe ends were welded to the niobium foil which covers the pipe, closely matching its contours, in each case by means of a niobium foil. The double pipe which had been assembled in this manner was finally subjected to hot isostatic pressing at 1350° C. and $100 \times 10^6$ Pa and, as a result, was joined by material-to-material bonding. Finally, the composite pipe formed in this way underwent surface grinding at the outer circumference. The remaining wall thickness of the niobium casing was approx. 0.5 mm. The two pipe ends were face-turned within the thickness of the projecting niobium, and the helical groove was drilled open at each of the end sides.

The composite material formed in this way, when examined in microsection, revealed cooling passages which were lined uniformly in terms of wall thickness, and with accurate contours, with niobium. The original parting surface between the inner and outer parts had completely disappeared after the diffusion of materials which took place during the hot isostatic pressing and the simultaneous grain growth. In the leak test, the cooling passages prove to be highly vacuum-tight. The limit of the mechanical load-bearing capacity of the composite component produced in this way was limited by the tensile or shear strength of the CFC, not by the strength of the joining surface.

EXAMPLE 3 describes the production of an X-ray rotary anode with CFC applied to the rear side.

A cylindrical disk of CFC (carbon fiber-reinforced carbon) with a diameter of 150 mm and a thickness of 50 mm was welded in a vacuum-tight manner into a pot-shaped can made from Nb sheet, thickness 1.0 mm. The canning sheet was coated on the CFC side with an Re layer, thickness 20 $\mu$m. On one side of the CFC disk, a shaft, which had been inserted into the pot base as part of the can, in the form of a cylindrical rod consisting of Ta10W, had also been welded in, centered with respect to the axis of rotation of the disk. The component which had been canned in this way was evacuated and then underwent hot isostatic pressing at a temperature of 1500° C. to 1800° C. and a pressure of $100–200 \times 10^6$ Pa for 4 to 6 hours. In the process, the canning sheet and Ta10W shaft were joined with material-to-material bonding to the CFC component. The CFC part surrounded with Nb on all sides, which was obtained in this way, was vacuum-welded, using a collar-like projection of the can, to a round disk, which had been placed onto the part and consisted of the molybdenum alloy TZM, together with the focal path coating of W10Re, and underwent hot isostatic pressing at 1400° C. and a pressure of $80 \times 10^6$ Pa for 4 hours. Finally, the X-ray rotary anode was completed by exposing the focal path by grinding and by contour-turning of the other outer surfaces.

Compared to composites of TZM and CFC produced by brazing, the process according to the invention is distinguished by high reproducibility and a considerably higher composite strength. In the spin test, the rotary anode produced in accordance with the invention had a considerably higher rupture index than the comparative anode. This surprising result is attributed to the compressive stresses exerted on the CFC part by the Nb can and to the increased composite strength.

I claim:

1. A method of producing a composite component, which comprises:

providing at least one non-metallic structural component of high-temperature material and at least one further structural component of high-temperature material;

applying a gastight metal foil with a thickness from 10 to 2000 $\mu$m to the non-metallic structural component by way of a canning process followed by at least one of die pressing and isostatic pressing, to form at least one canned component; and subsequently joining at least two of said structural components at joining surfaces thereof, with a process selected from the group consisting of brazing, welding, and common canning in a metal foil with a material-to-material bond effected by hot pressing or hot isostatic pressing, to form the composite component.

2. The method according to claim 1, which comprises providing one of the structural components machined with surface recesses.

3. The method according to claim 1, wherein the at least one non-metallic structural component is formed of at least one material selected from the group consisting of carbon fiber-reinforced carbon, graphite, and fiber-reinforced silicon carbide.

4. The method according to claim 1, wherein the at least one non-metallic structural component is formed of at least one material selected from the group consisting of carbides, nitrides, and oxide ceramics.

5. The method according to claim 1, which comprises canning with a metal foil of a high-melting metal having a thickness of 10 to 500 $\mu$m.

6. The method according to claim 5, which comprises canning with a foil formed from a material selected from the group consisting of Ta, Nb, a Ta-based alloy, and a Nb-based alloy.

7. The method according to claim 1, which comprises canning two structural components and joining the structural components to the metal foil with material-to-material bonding, and subsequently joining the two structural components, with material-to-material bonding, to surface recesses that are mirror-symmetrical with respect to the joining surface.

8. The method according to claim 1, which comprises canning with a foil formed of a material selected from the group consisting of tantalum and tungsten coated on one side with rhenium by way of a CVD or PVD process.

9. The method according to claim 1, which comprises encasing the structural component with a metal foil having a thickness of between 50 $\mu$m and 200 $\mu$m.

10. The method according to claim 1, which comprises performing the die pressing step by hot die pressing, and performing the isostatic pressing step by hot isostatic pressing.

11. The method according to claim 9, which comprises producing in the individual structural component a material-to-material bond between the structural component and the metal foil by way of the pressing step selected from the hot pressing an hot isostatic pressing.

12. The method according to claim 1, which comprises, prior to the canning step, depositing a continuous metal layer from vapor phase, to at least partial regions of the surface of at least one structural component.

13. The method according to claim 1, which comprises canning a nonmetallic structural component together with at least one metallic structural component into a common metal foil and joining the non-metallic and metallic structural components.

14. The method according to claim 1, which comprises, after the joining step, mechanically removing the canning material from an outer surface of the composite component.

15. The method according to claim 14, which comprises selectively removing the canning material completely or in part or in certain regions of the outer surface.

16. The method according to claim 1, which comprises providing at least one of the structural components with a surface having profile contours, and wherein the gastight metal foil is tightly formed into the profile contours in the canning process.

* * * * *